Nov. 24, 1942.    R. H. PARK    2,303,229
SYNCHRONOUS GENERATOR AND MOTOR STABILIZATION
Filed May 23, 1940
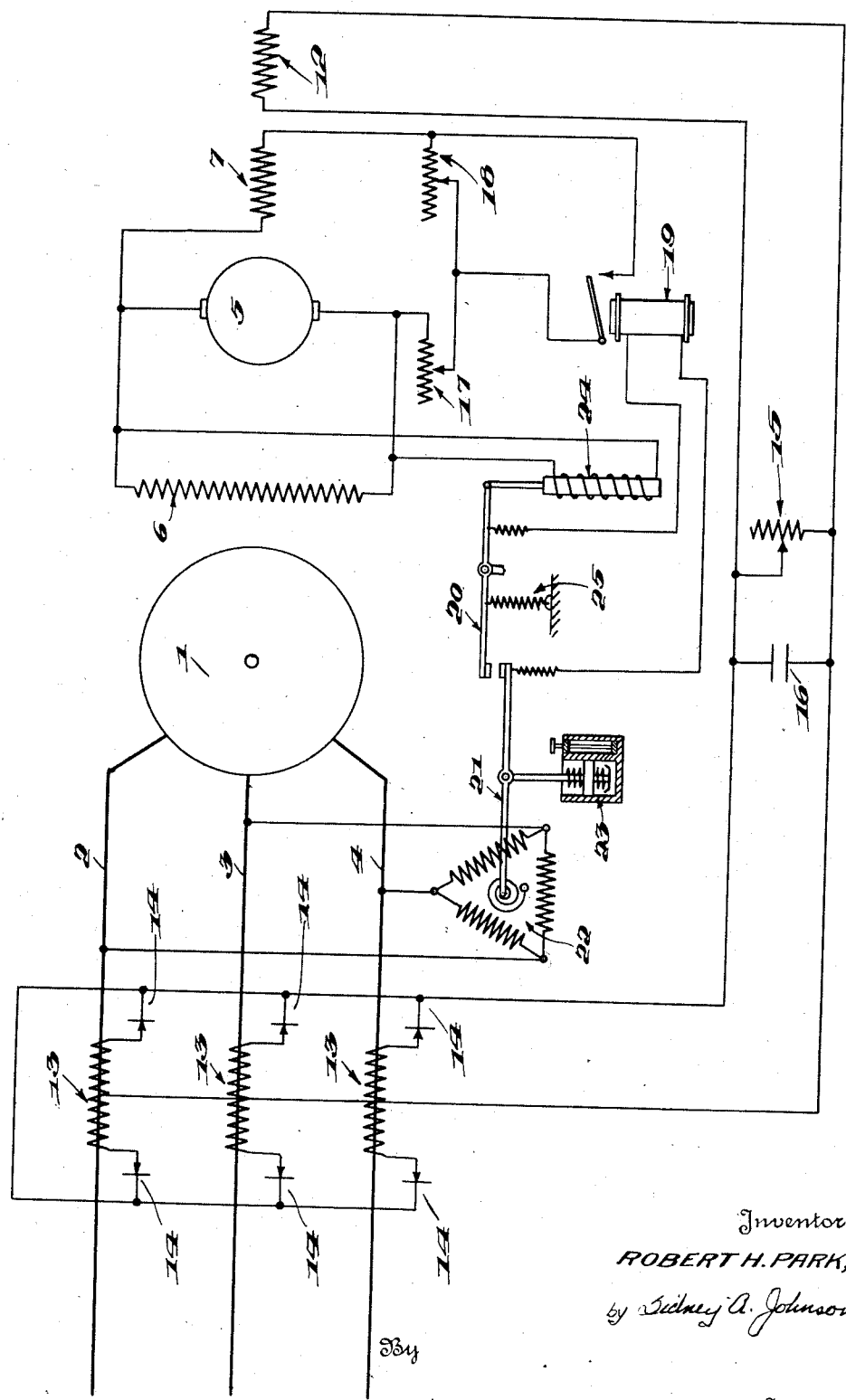
Inventor
ROBERT H. PARK,
by Sidney A. Johnson
Attorney Patented Nov. 24, 1942

2,303,229

UNITED STATES PATENT OFFICE 2,303,229

SYNCHRONOUS GENERATOR AND MOTOR STABILIZATION

Robert Hiram Park, Millington, N. J., assignor to American Cyanamid Company, New York, N. Y., a corporation of Maine Application May 23, 1940, Serial No. 336,831

1 Claim. (Cl. 171—223)

This invention relates to the excitation of alternating current machines and more particularly to regulating means for stabilizing synchronous alternating current machines.

The maximum load that can be carried by a synchronous machine depends upon stability limit, which in turn is affected, in the case of a generator, by the effect of the connected load and the connections to the load and, in the case of a motor, by the electrical characteristics of the source of power.

It is known that the stability of a synchronous machine can be increased by increasing the air gap between the rotor and the stator. This type of stability which is attained without benefit of automatic control devices is referred to as "inherent stability." When the air gap is increased, however, the number of ampere turns applied to the field winding must be increased to obtain the necessary flux, and this results in a lowered efficiency because of the increased heat losses, and increases the size and cost of the machine for a given capacity.

It is also known that when a short circuit or sudden, relatively large increment of load is thrown on a line, the synchronous generator field current is momentarily increased corresponding to the increase in armature current, but this current then dies off as a transient because there has been no corresponding change in the field voltage to sustain it. The same effect and situation is obtained when a sudden load is thrown on a synchronous motor. It has been proposed to provide synchronous machines with devices responsive to machine armature voltage or current or both which operate to increase the field excitation when the armature voltage drops or when the armature current increases. Stability attained by the action of these automatic devices is referred to as "dynamic stability." It is with an improved device responsive to any increase in armature current that my invention is particularly concerned. Such an improved device eliminates the necessity for having a large air gap in order to keep the machine in synchronization when temporarily overloaded, thereby increasing the efficiency and utility of the synchronous machines.

In order to shift the responsibility for maintaining synchronism onto the excitation system, the regulating device controlling the amount of field excitation must possess the following characteristics:

1. It must never stick or fail to function,
2. It must be sufficiently fast to follow within a small fraction of a second the change in excitation required, otherwise the transient field current built up by the change in armature current will die away,
3. The "ceiling" voltage of the exciter must be sufficient to take care of any demands, otherwise the machine cannot maintain its voltage under abnormal conditions.

A synchronous alternator controlled by even a sensitive type of voltage regulator, as a Tirrill or vibratory type of regulator, behaves for sudden changes of load much the same as if it were operating at a constant field voltage. The terminal voltage must first change, causing a change in the setting of the contacts, before a corresponding change in the exciting voltage takes place. Furthermore, regulators of the mechanical type are apt to stick or fail. Even an occasional failure operates to thwart the commercial success of such machines.

It has also been proposed to supplement the field current applied to the synchronous machine from the exciting generator by connecting in series therewith transformers connected to the transmission line, the alternating current generated being rectified by vapor arc rectifiers. Such a device gives an almost instantaneous response in changing the excitation in proportion to the armature current, but is subject to failure when the arc becomes extinguished, and also is expensive in the case of large synchronous machines because of the heavy transformers required and the large arc rectifiers necessary to convert the high currents which may be generated.

In accordance with my invention improved means are provided for instantaneously changing the excitation of synchronous machines in accordance with the armature current. My invention provides for the supplying of a current proportional to the armature current to furnish part of the excitation for the exciter for the synchronous machine. My invention may be best understood by reference to the following description taken in connection with the accompanying drawing, the single figure of which is a diagrammatic showing of one embodiment of my invention applied to a synchronous generator.

Referring to the figure of the drawing, I denotes a three phase alternating current generator providing alternating current to the transmission lines 2, 3 and 4. Reference character 5 denotes the direct current exciter generator which is mounted on the shaft of the synchronous A. C. generator, and which supplies the current to the field winding 6 of the A. C. generator. The excitation current for the main exciter field winding 7 is supplied by the exciting generator 5 by means of the shunt connection.

In addition to the main field winding 7, I provide the exciter with an auxiliary field winding 12, which is supplied with a direct current proportional to the alternating current flowing in the transmission lines 2, 3 and 4. This current is provided by placing a small current transformer 13 on each of the transmission lines 2, 3, 4. These three transformers 13 are mid-connected in series and connected to one side of the auxiliary field winding 12. The end connections of the transformers 13 are connected first to copper oxide rectifiers 14 and then connected back-to-back in series to the other terminal of the auxiliary field winding 12. A variable resistance 15 and a capacitor 16 are connected in parallel across the auxiliary field winding. These serve to iron out the fluctuations in the direct current passing through the rectifiers, and the variable resistance may also be used to regulate the proportion of the current which will pass through the auxiliary field winding.

Resistors 17 and 18 are provided to control the proportion of the current generated passing through fields 6 and 7. Resistor 17 may be varied by hand to secure the desired current division, while resistor 18 is shown as controlled from a voltage regulator. This arrangement is preferable because if resistor 18 were not used, under varying load conditions, as when for example, the synchronous machine were operating at full load and hence with considerable excitation in field 12, resistor 17 would be largely cut in and there would be little excitation in field winding 7. In case the load were suddenly removed, the resistance would be greater than the maximum resistance which would allow the exciter to build up, and hence the exciter voltage would diminish to a point where armature current drawn from the line would provide enough excitation in field winding 12 to establish equilibrium. This would result in an abnormally low armature voltage.

In order to prevent this a voltage regulator is provided which will automatically cut out resistor 18 in the event of a sudden drop in armature voltage. For this purpose, I prefer to use, as shown on the drawing, a regulator substantially similar to that described in my prior U. S. Patent 1,743,798. Relay 19, when closed, will cut out resistor 18, and is actuated by the closing of the contact ends on contact arms 20 and 21. The contact arm 20 is actuated by a dynamo-electric device 22. The motion of the contact arm 21 is modified by damping means 23. Contact arm 20 is actuated by solenoid 24, opposing the action of which is a spring 25. Solenoid 24 is arranged to be energized in accordance with the electrical characteristics of the alternator field circuit 6. Closing of the contacts on the contact arms 20 and 21 will energize and close relay 19, the relay circuit, of course, being supplied with some source of power (not shown), which will short circuit resistor 18.

As explained more in detail in my prior patent mentioned above, increasing line voltage will increase the torque of dynamo-electric device 22, intended to lower contact arm 21, thereby decreasing the time during which the relay circuit is energized. On the other hand, decreasing line voltage will decrease the torque of device 22, thus increasing the time during which the relay circuit is energized. The operation of this regulator will serve to maintain normal voltage automatically, independently of manual adjustments. Although the voltage regulator is subject to failure and sticking of contacts, as are all mechanical regulators, it is merely an auxiliary regulator which serves the function of preventing excessive variations in armature voltage with load and failure to operate will not result in machine instability.

By the use of the term "transmission line" in the above discussion of the operation of my invention, I do not intend that the invention should be limited to a transmission line extending over considerable distances, as the term is generally understood. The invention is equally applicable to situations where a motor generator set are operated in close proximity to each other and the power lines connecting these machines are relatively short.

The voltage regulator shown is by way of illustration only and obviously any type of voltage regulator might be used to control the resistance in the shunt field circuit.

From the above examples it will be seen that my invention broadly consists in supplying an auxiliary field to the exciting generator whose excitation current instantly varies in accordance with the armature line current. Any change in the excitation of auxiliary field 12 produces a change in the voltage of the excitation generator 5, and a corresponding change in the excitation of the A. C. generator field 6. The change in field excitation is practically instantaneous with the change in armature current caused by the load change on the generator or motor. Furthermore, my improved system for "dynamic stabilization" is reliable in operation and simple and inexpensive in construction. No moving parts are present which render it subject to mechanical failure. Since I do not attempt to supply additional field directly with increasing armature current or decreasing terminal voltage of the synchronous machine, but rather produce changes in the excitation indirectly by changing the excitation of the exciting generator, it is only necessary to use relatively small amounts of current in my control device. Hence, I am able to use small transformers, which are inexpensive, and I am also able to readily use the rugged and dependable dry, chemical rectifiers as the well known copper oxide rectifier, the selenium rectifier, and the like. Such rectifiers have the further advantage of low cost, especially when the power requirements placed on the rectifier does not require them to be of excessive size. The copper oxide type rectifier is much to be preferred over the tube or vapor arc rectifier since these are subject to failure, may become extinguished or arc internally and short circuit.

The use of the shunt resistor 15 and the capacitor 16 is desirable though not essential. When used, the shunt resistor assists in reducing the inductive voltage which tends to accompany sudden changes in the armature current and also provides a path for harmonic currents, which cannot easily penetrate the auxiliary field winding. This is advantageous for otherwise these currents would build up heavy voltages across the current transformers. The shunt capacitor also provides a path for harmonic currents, and reduces their voltages.

By proper adjustment of the resistors 15, 17 and 18, the fraction of the excitation for the exciting motor supplied by the auxiliary field may be controlled.

To adapt my regulating device to single phase generators or motors, one of the transformers 13, and sets of rectifiers 14, would be eliminated.

In addition to the specific forms of my invention and modifications thereof discussed above, I am aware that my invention may be embodied in other specific forms without departing from the spirit of my invention. I therefore desire that the embodiments of my invention, described above, be considered as illustrative only, reference being had to the appended claim rather than the specific examples to indicate the scope of my invention.

I claim:

The combination of a synchronous machine comprising a field circuit and an armature circuit, a transmission line connected to said armature circuit, an exciting generator for energizing said field circuit, a main field circuit for said exciting generator being shunt connected to and energized by said exciting generator, variable resistance means for controlling the ratio of the current generated by said exciting generator passing through said field circuit and said main field circuit, voltage regulating means responsive to the transmission line voltage for controlling said variable resistance, an auxiliary field circuit for said exciting generator, and rectifying means interconnecting said auxiliary field circuit and transmission line for applying to said auxiliary field circuit current which varies in direct proportion to the current flowing through said armature circuit and transmission line.

ROBERT HIRAM PARK.